United States Patent Office 3,198,749
Patented Aug. 3, 1965

3,198,749
SILICA-ALUMINA-GALLIUM OXIDE CATALYST AND METHOD OF PREPARATION THEREOF
Elroy Merle Gladrow, Edison Township, Middlesex County, N.J., and Richard Joseph De Feo, Baton Rouge, La., assignors to Esso Research and Engineering Company, a corporation of Delaware
No Drawing. Filed Oct. 10, 1960, Ser. No. 61,340
4 Claims. (Cl. 252—453)

The present invention relates to the preparation of improved cracking catalysts containing silica and alumina.

According to the present invention stable silica-alumina cracking catalysts having high percentages of alumina are prepared which are more selective and active than conventional commercial catalysts and more selective and active than catalysts prepared according to the prior art teachings. These new catalysts have a complete dispersion of the alumina and silica in the catalyst, have high acid strength stability and high surface area retention after steaming compared to conventional commercial silica-alumina cracking catalysts.

In one form of the invention the silica alumina gelled composite containing a high percentage of alumina is aged at room temperature for an extended period of time.

In another form of the invention a superior high alumina content silica-alumina cracking catalyst is made by hydrolyzing a non-aqueous mixed solution of organic silica and aluminum compounds, treating with a gaseous acid such as HCl, preferably $CO_2$, and then with an aqueous solution of an acid.

In another form of the present invention the silica-alumina catalyst containing a high percentage of alumina was prepared by mixing a silica hydrosol with an organic aluminum salt such as aluminum citrate or tartrate.

In another form of the present invention the silica-alumina catalyst containing a high percentage of alumina contained gallium oxide.

In the course of a study of the fundamental properties of cracking catalysts it has been found that, with silica-alumina catalysts, the performance of the finished catalyst in a cracking operation is dependent upon certain properties (physical and chemical) which the catalyst has and which are built into the catalyst by the particular procedure or process used in the preparation of the catalyst. For instance, it has been found that it is important that a catalyst have high acid strength and titer, high stability of surface area and acidity when the catalyst is subjected to steam, and a complete dispersion of the alumina throughout the amorphous silica network so that no alumina crystallites are observed by X-ray diffraction techniques.

Silica-alumina catalysts containing high percentages of alumina and comprising about 0.8 Al atoms per Si atom or about 40 wt. percent $Al_2O_3$ have been made by a variety of techniques and their cracking and physical properties studied. Heretofore these catalysts have shown, in general, a higher activity (conversion at a specified feed rate) and a somewhat higher surface area stability towards steam but they have also been notorious for producing more $C_3$— gas and coke than standard conventional silica-alumina catalyst containing 13% $Al_2O_3$. In addition all of the prior commercial silica-alumina catalysts containing high percentages of alumina which have been examined by X-ray diffraction have shown crystalline alumina in the composite. Alumina is a cracking catalyst in its own right, but catalyzes cracking by a different mechanism than mixed oxide acidic catalysts, giving high selectivity towards $C_3$— gas and carbon or coke in the cracked products.

With cracking catalysts of the mixed oxide type it is essential to have a high degree of dispersion or complete dispersion of the minor oxide component throughout the framework of the major oxide component and to have a high acid strength and high acid strength retention after heating and/or steaming, and high surface area retention after heating and/or steaming.

It has been known for some time that high alumina silica-alumina type catalysts exhibit high activity relative to conventional commercial 13% $Al_2O_3$—$SiO_2$ catalysts, particularly after steaming. But this higher activity is obtained at the expense of poor product distribution, inasmuch as the high alumina catalysts made relatively high coke and $C_3$— gas. X-ray diffraction patterns of these catalysts have heretofore always shown the presence of crystalline alumina. This suggests that the catalyst is not performing as efficiently as it might, but instead the crystalline alumina cracks independently as a catalyst in its own right. Since alumina alone cracks hydrocarbons to give very high yields of coke and light gases, it is possible that the observed poor behavior of prior high alumina content silica-alumina catalysts could be due to the crystalline alumina present in the catalyst composite. This suggests that an improved high alumina catalyst would be one having a complete dispersion of the alumina (by exhibiting the lack of any crystalline alumina).

We have found recently also that the acid strength and titer of the active catalytic centers contribute to the quality of the products inasmuch as acidity bears on the relative amounts of the various reactions occurring in the over-all cracking operation. This has been shown to explain the difference in the octane numbers of gasolines produced from the same feed stock using catalysts of different acid strength. Conventional $SiO_2$—$Al_2O_3$ catalyst containing 13% $Al_2O_3$ has its acid strength and titer degraded by heat and steam so that activity is lost rather rapidly in a continuous cracking operation. It is apparent, then, that an improved catalyst over conventional $SiO_2$—$Al_2O_3$ (13% $Al_2O_3$) catalyst should have a higher acid stability while retaining acid strength when subjected to heat and/or steam.

Surface area of catalysts is an important property, as it represents to some degree the amount of available "space" to permit reactions to occur. Silica-alumina catalysts in general undergo a continual decrease in surface area when subjected to heat and steam. The rate of surface area decline decreases as the alumina content increases. This suggests, then, that high surface area, and high surface area retention, which can be attained in high alumina-silica alumina catalysts is a very desirable feature.

According to the present invention an improved silica-alumina catalyst is made which contains a high percentage of alumina and which shows no crystalline alumina, has a high acid strength and titer, and a high surface area retention after steaming. With the present invention a silica-alumina catalyst containing a high percentage of alumina is produced which has improved selectivity and activity. One method for making such a catalyst employs an aging step carried out at room temperature for an extended period of time.

The aging or heat soaking step for the silica-alumina high alumina content catalyst is carried out after the silica-alumina composite or gel has its pH adjusted to the range of 6.0 to 8.0, preferably to about 7.0. Within minutes after adjusting the pH the composite undergoes gelation. The aging is carried out at room temperature for about 10 to 30 hours or possibly longer. During aging the alumina undergoes complete dispersion throughout the silica network which result is not obtained under other conditions.

The present invention is an improvement on Kimberlin et al. Patent 2,798,857, granted July 9, 1957. Following the general steps of this Kimberlin et al. patent and including the aging step of the present invention produces a highly active and selective catalyst.

EXAMPLE 1

A catalyst comprising about 40% $Al_2O_3$ and 60% by weight of $SiO_2$ was prepared by mixing about 4.0 liters of freshly prepared silica hydrosol (3% $SiO_2$), made by percolating sodium silicate solution over an acid form cation exchange resin, with about one liter of an 0.4 N $NH_4OH$ solution. The silica hydrosol may have a pH between about 8 and 11.

The resulting silica hydrosol had a pH of about 8.5. To this mixture were added 0.92 liter of an anhydrous aluminum amylate solution (87 g. $Al_2O_3$/l.) using rapid and efficient stirring. The aluminum amylate solution was prepared by dissolving 10 pounds of aluminum metal in 23 gallons of a 50–50 mixture of mixed amyl alcohols and petroleum naphtha, the naphtha boiling in the range of 200° F. to 300° F. according to the method described in U.S. Patent 2,636,865 (taken from column 3 of Patent No. 2,798,857).

Stirring was accomplished by means of a propeller as set forth in Patent No. 2,798,857. By thus mixing the silica hydrosol and the anhydrous aluminum amylate solution with stirring, a hydrous slurry of silica-alumina particles was formed having a pH of about 8.55. After continued stirring for about 15 minutes, 7.2 cc. of glacial acetic acid were added to lower the pH to about 7.0. After further continued stirring for about 4 or 5 minutes, the slurry set to a stiff gel. The alcohol and hydrocarbon solvent were drained off and rejected.

The gelled catalyst composite after standing for about an hour was oven dried at a temperature of about 250° F. for about 16 hours and then calcined for about 16 hours at about 1000° F. This catalyst is designated "A" and is a catalyst made without the aging step according to the present invention. This example also shows that the composite should not be dried before aging.

EXAMPLE 2

Another catalyst comprising about 40 wt. percent $Al_2O_3$ and 60 wt. percent $SiO_2$ was prepared according to the steps set forth in Example 1 up to the preparation of the gel composite having a pH of about 7.0. The gelled silica-alumina catalyst prior to drying was left at room temperature (about 80° F.) for about 24 hours and then oven dried at 250° F. for about 16 hours. The dried gel was then calcined 16 hours at about 1000° F. This catalyst is designated "B" and sets forth one catalyst of the present invention. This catalyst also shows the advantage of not drying the catalyst before aging.

EXAMPLE 3

Another 40 wt. percent $Al_2O_3$-60 wt. percent $SiO_2$ catalyst was prepared according to Example 2 except that after gelling at a pH of about 7.0, the gel composite was heat soaked for 3 hours at about 190° F., then cooled to room temperature (about 80° F.) and left at room temperature for about 24 hours. Then the gel composite was oven dried at about 250° F. for about 16 hours. The dried gel composite was then calcined for about 16 hours at about 1000° F. This catalyst is designated "C."

EXAMPLE 4

The catalyst of this example is commercial conventional 13 wt. percent $Al_2O_3$-87 wt. percent $SiO_2$ catalyst and is believed to be made by making a pumpable slurry of sodium silicate at a pH of about 7.0, impregnating the slurry with acid aluminum sulfate, ammoniating to restore the proper pH to precipitate the alumina and then spray drying. This catalyst was calcined for about 16 hours at atmospheric pressure at about 1000° F. This catalyst is designated "D." This catalyst is not a high alumina content silica-alumina catalyst.

EXAMPLE 5

Portions of catalysts "A," "B," "C" and "D" were steamed 24 hours at 1050° F. and atmospheric pressure and were examined by X-ray diffraction to determine if any alumina crystallites were present. The results are given in Table 1.

*Table 1*

| Catalyst | A | B | C | D |
|---|---|---|---|---|
| $Al_2O_3$ Crystallites present | Yes | No | Yes | No |

The catalyst "B" of the present invention showed no $Al_2O_3$ crystallites along with the conventional low alumina silica-alumina catalyst.

EXAMPLE 6

Portions of Catalysts "A," "B," "C" and "D" were steamed 16 hours at 1050° F. and atmospheric pressure. The acid titer and acid strength distribution of the fresh and steamed catalysts was determined by means of a titration technique (H. A. Benesi, J. Phys. Chem., 61, 970–73 (1957), using n-butyl amine in a non-aqueous system and various Hammett indicators covering a wide acid strength range. The results follow:

| Acid Strength, Percent $H_2SO_4$ equiv. | Acid Titer, Milliequivalents/g. | | | | |
|---|---|---|---|---|---|
|  | <48 | 48–71 | 71–91 | >91 | Total |
| A, fresh | 0.00 | 0.00 | 0.06 | 0.57 | 0.63 |
| A, steamed |  | 0.00 | 0.33 | 0.00 | 0.33 |
| B, fresh | 0.00 | 0.00 | 0.07 | 0.48 | 0.55 |
| B, steamed | 0.01 | 0.03 | 0.29 | 0.02 | 0.35 |
| C, fresh | 0.00 | 0.00 | 0.16 | 0.42 | 0.58 |
| C, steamed | 0.00 | 0.10 | 0.17 | 0.00 | 0.27 |
| D, fresh | 0.00 | 0.00 | 0.00 | 0.38 | 0.38 |
| D, steamed | 0.00 | 0.05 | 0.08 | 0.00 | 0.13 |

Catalyst B of the present invention shows the best acidity retention of any of these catalysts after steaming and Catalyst D the poorest. Catalysts A and C are nearly as good as B on acidity retention. High acidity retention both in acid strength and titer is an indication of high activity of the steamed catalyst.

EXAMPLE 7

Portions of the fresh and steamed catalysts A, B, C and D were examined for cracking performance using pure cetane feed at 900° F. The results with the fresh catalysts is summarized below. The w./hr./w. is weight of feed per hour per weight of catalyst.

| Catalyst | A | B | C | D |
|---|---|---|---|---|
| Conversion, percent | 50 | 50 | 50 | 50 |
| W./hr./w. | 4.3 | 7.1 | 3.1 | 4.1 |
| $C_3$—Gas Yield, wt. percent | 12.4 | 9.7 | 11.0 | 11.0 |

Thus it is seen that the catalyst "B" of the present invention is more active and selective than any of the other catalysts.

The Catalysts "A," "B," "C" and "D" were tested after steaming for about 24 hours at about 1050° F. and atmospheric pressure as outlined above. The results follow:

| Catalyst | A | B | C | D |
|---|---|---|---|---|
| Conversion, Wt. Percent | 30 | 30 | 30 | 30 |
| W./hr./w. | 5.7 | 6.7 | 3.7 | 4.1 |
| $C^3$—Gas, Wt. Percent | 5.7 | 5.5 | 5.0 | 5.5 |

Catalyst "B" is more active than the other catalysts.

The preferred Catalyst "B" was compared with a standard commercial 25% $Al_2O_3$-75% $SiO_2$ cracking catalyst in a fixed bed test with a gas oil feed. The catalysts were shaped into 3/16" by 3/16" pellets and steamed at 1050° F., 16 hours, 0 p.s.i.g before testing.

Conditions: East Texas Light Gas Oil feed, 950° F., 2 v./v./hr., 30 min. cycle (v./v./hr. is volume of liquid feed per volume of catalyst per hour)

|  | Δ percent with respect to 25% $Al_2O_3$ standard catalyst | | | | |
|---|---|---|---|---|---|
|  | Δ Conversion | Δ Naphtha | Δ Gas | Δ Carbon | Δ O.N.[1] |
| Catalyst "B" | +19.9 | +4.1 | −4.0 | −1.3 | +0.5 |

[1] Research O.N.+3 ml. T.E.L.

These results show that catalyst "B" of the present invention gives a much higher conversion than the standard catalyst, along with improved selectivity as is shown by the higher naphtha yield, lower gas and carbon production, and slightly higher octane number. Once again it is demonstrated that superior performance is obtained with catalyst "B" of the present invention.

EXAMPLE 8

A catalyst comprising 35% $Al_2O_3$-65% $SiO_2$ was prepared in the preferred manner as given in Example 2 with the proportions changed to give a 35% $Al_2O_3$. Instead of using 4.0 liters of silica hydrosol, about 4.9 liters of silica hydrosol were used. This catalyst is designated B-1. This catalyst was steamed for 16 hours at 1050° at atmospheric pressure.

EXAMPLE 9

A standard commercial 25% $Al_2O_3$-75% $SiO_2$ catalyst was steamed for 16 hours at 1050° F. at atmospheric pressure. This catalyst is designated B-2.

EXAMPLE 10

Catalysts "A," "B-1" and "B-2" were compared in a fixed bed cracking test with the following results.

Conditions: East Texas Light Gas Oil feed, 950° F., 2 v./v./hr., 30 min. cycle

| Catalyst | Δ percent with respect to 25% standard catalyst (B-2) | | | | |
|---|---|---|---|---|---|
|  | Δ Conversion | Δ Naphtha | Δ Gas | Δ Carbon | Δ O.N.[1] |
| A | +17.9 | 0.0 | 0.0 | −0.3 | +0.3 |
| B-1 | +19.6 | +3.5 | −3.4 | −1.1 | +0.6 |

[1] Research +3 ml. T.E.L.

These results show that a catalyst prepared according to this form of the invention gives higher activity and conversion, with an improved product distribution compared to the commercial 25% $Al_2O_3$ catalyst. The preferred catalyst yields more naphtha, less carbon and gas, and gives a higher octane number than either the standard catalyst B-2 or Catalyst A. This is believed to be due to the improved dispersion of the $Al_2O_3$ in the catalyst prepared according to the present invention.

EXAMPLE 11

The catalyst in this example is a commercially available material comprising 13% $Al_2O_3$-87% $SiO_2$ and similar to Catalyst D of Example 4. This catalyst was subjected to an atmosphere of steam at 1050° F., 0 p.s.i.g., for 24 hours. This catalyst is designated Catalyst "E."

EXAMPLE 12

A solution was prepared by admixing 416 g. ethyl silicate and 1600 ml. Pentasol (mixed amyl alcohols). To this organic solution were added, with stirring, 920 ml. of an anhydrous aluminum alcoholate solution (equivalent concentration 87 gr. $Al_2O_3$ per liter) in Pentasol. After stirring for an additional 10 minutes, dry HCl gas was bubbled into the solution or mixture for about 5 minutes at room temperature. The mixture or composite organic solution was left standing for 48 hours at room temperature and then hydrolyzed by slow addition with rapid stirring to a vessel containing 4000 ml. $H_2O$ and 25 ml. concentrated HCl to form a slurry of gelled silica-alumina particles.

The mixture was then heat soaked for 3 hours at 170–190° F., cooled to room temperature and the pH adjusted to 6.8 by addition of $NH_4OH$ and then oven dried at 250° F. The catalyst composite was calcined 16 hours at 1000° F. in ambient air and then placed in a vessel and subjected to an atmosphere of steam at 1050° F., 0 p.s.i.g., for 16 hours. This catalyst comprises 40% $Al_2O_3$-60% $SiO_2$ and is designated Catalyst "F."

The proportions of the chemicals used in Example 12 can be varied to give a silica alumina catalyst containing between about 10 to 15% alumina by weight.

EXAMPLE 13

Catalysts "E" and "F" were titrated by the method of Benesi (J.A.C.S., 78, 5490 (1956); also J. Phs. Chem., 61, 970 (1957)), using butyl amine in a non-aqueous system and show the following relations.

| Acid Strength Region, Percent $H_2SO_4$ | Acid Titer, Meq./g. | | | | |
|---|---|---|---|---|---|
|  | <48 | 48–71 | 71–91 | >91 | Total |
| Catalyst E | 0.00 | 0.05 | 0.08 | 0.00 | 0.13 |
| Catalyst F | 0.00 | 0.00 | 0.13 | 0.13 | 0.26 |

Thus it is seen that the catalyst of the present invention, "F," shows a much higher acid titer after steaming than commercial Catalyst "E" and in addition the remaining acid centers are at a much higher acid strength level.

Catalysts "E" and "F" were also examined by X-ray diffraction methods to see if any crystalline alumina was present in the composite. Neither catalyst showed the presence of crystalline $Al_2O_3$.

EXAMPLE 14

Catalysts "E" and "F" were tested in a cracking operation feeding pure cetane (N-$C_{16}H_{34}$) at 900° F. The following results were obtained.

|  | At 45% Conversion | | |
|---|---|---|---|
|  | W./hr./w. | Percent $C_3$–Gas | Percent Naphtha |
| Catalyst "E" | 2.2 | 8.8 | 20 |
| Catalyst "F" | 3.0 | 8.6 | 20 |

These data show the catalyst of the present invention is more active than the standard commercial catalyst and shows as good, if not better, selectivity characteristics.

EXAMPLE 15

The surface area of Catalyst "E" and Catalyst "F" were determined by the BET method using nitrogen adsorption, both for the fresh catalyst after heating 16 hours at 1000° F. and also after steaming the catalysts for 16 hours at 1050° F. and atmospheric pressure. The proportionate amount of the original surface areas retained after steaming for each catalyst is listed below.

Percent original sufrace area retained

Catalyst "E" _____ 45
Catalyst "F" _____ 93

Thus, the vastly improved stability of the catalyst of the present invention to surface area loss by steam is demonstrated.

EXAMPLE 16

The preferred Catalyst "F" was compared to standard commercial 25% $A_2O_3$-75% $SiO_2$ cracking catalyst (B-2) in a fixed bed test with the following results. Each catalyst was steamed at 1050° F., 0 p.s.i.g., 16 hours prior to the test.

Conditions: East Texas Light Gas Oil feed, 950° F., 2 v./v./hr., 30 min. cycle.

| | Δ Percent with respect to 25% Al₂O₃ standard catalyst (B-2) | | | | |
|---|---|---|---|---|---|
| | Δ conversion | Δ naphtha | Δ gas | Δ carbon | Δ O.N.[1] |
| Catalyst "F" | +13.9 | +3.5 | -3.0 | -1.2 | +0.5 |

[1] Research O.N.+3 ml. T.E.L.

These results show that this Catalyst "F" of our invention gives a much higher conversion than the standard catalyst, along with higher yield of naphtha, lower gas and carbon, and a slight increase in octane number.

EXAMPLE 17

For regeneration of cracking catalysts, it is preferred that they have a large pore volume. In this catalyst of the present invention the pore volume may be varied by controlling the amount of dry HCl which is added during the preparation of the catalyst. Thus with the addition of more dry HCl, the pore volume increases. The amount of dry HCl referred to in Example 12 and below as "limited addition" is not sufficient to cause gelation of the catalyst composite and when addition is complete, the solution remains clear. However, if additional dry HCl is added (approx. 15 minutes of addition), the solution becomes cloudy and the material begins to gel. This degree of HCl addition is referred to as complete saturation in the example below.

| HCl Added | P.V. | Chloride,[1] Weight Percent |
|---|---|---|
| Limited addition | 0.31 | 0.08 |
| Complete saturation | 0.65 | 0.06 |

[1] Chloride content after steaming 16 hours, 1,050° F., 0 p.s.i.g.

The chloride content of the catalyst upon steaming is negligible. This indicates that the high activity of the catalyst of the present invention is not due to aluminum chloride in the catalyst.

In brief compass, this form of the present invention entails a simple and convenient method for preparing high alumina silica-alumina catalysts which are highly active and selective, and have the desirable properties of high acid strength and titer, low attrition rate, and good dispersion of the components throughout the catalyst composite. This method comprises (1) the formation of a homogeneous non-aqueous solution of the silica and alumina precursors, and (2) hydrolysis of the mixture to effect good dispersion of the components amongst each other. Catalysts so prepared have outstanding catalytic, physical and chemical properties.

In another form of the invention using organic silica and aluminum compounds the gaseous acid used is carbon dioxide. The $CO_2$ gas causes partial gelation of the alumina and silica micelles and subsequent hydrolysis of the gel composite in a dilute aqueous acid solution followed by drying and calcining produces a superior catalyst. All acidic gases are not the equivalents of HCl gas or $CO_2$ gas as will be shown hereinafter.

Carbon dioxide gas possesses decided advantages over HCl gas that make it a preferred material to use in manufacturing catalysts according to a method of the present invention. For example, no washing of the catalyst is required as there is when using HCl to remove residual chloride. Also the $CO_2$ gas may be injected under pressure and subsequently recovered and recycled. The possibility of catalyst contamination from equipment corrosion is eliminated. In addition there is an economic and health advantage in using $CO_2$.

Catalyst "E" from Example 11 will be referred to in the next group of examples for purpose of comparison.

EXAMPLE 18

416 grams ethyl orthosilicate were diluted with 1600 cc. Pentasol. To this were added, with stirring, 920 cc. aluminum alcoholate solution (equiv. to 87 gr. $Al_2O_3$/liter). The composite solution was then hydrolyzed in 4 liters of water containing 25 cc. concentrated HCl. The aqueous slurry was aged 16 hours at room temperature and then oven dried at 250° F. The oven dried material was steamed 16 hours at 1050° F. and atmospheric pressure. This catalyst comprises 40% $Al_2O_3$-60% $SiO_2$ and is designated "G."

EXAMPLE 19

416 grams ethyl silicate were diluted with 1600 cc. Pentasol. To this are added, with stirring, 920 cc. of aluminum alcoholate solution (equiv. to 87 g. $Al_2O_3$/liter). After admixture was complete, stirring was continued and $SO_2$ was bubbled through the solution for 10 minutes. The composite was then hydrolyzed in 4 liters of $H_2O$ containing 25 cc. HCl, aged 16 hours at room temperature and oven dried at 250° F. The material was then steamed at 1050° F. for 16 hours at atmospheric pressure. This catalyst comprises 40% $Al_2O_3$-60% $SiO_2$ and is designated "H."

EXAMPLE 20

416 grams ethyl silicate were diluted with 1600 cc. Pentasol. To this solution are added, with stirring, 920 cc. aluminum alcoholate solution (equiv. to 87 g. $Al_2O_3$/liter). After admixture was complete, stirring was continued and $CO_2$ bubbled through the solution for 10 minutes. Toward the later period of this $CO_2$ treatment, the solution became considerably more viscous, indicating some sort of a gelation or polymerization taking place between the components. The composite was then hydrolyzed in 4 liters of $H_2O$ containing 25 cc. concentrated HCl, left to age 16 hours at room temperature and then oven dried at 250° F. The material was then steamed for 16 hours at 1050° F. and atmospheric pressure. This catalyst comprises 40% $Al_2O_3$-60% $SiO_2$ and is designated "I." It is one of the improved catalysts of the present invention.

EXAMPLE 21

Portions of Catalysts "E," "G," "H" and "I" after steaming were titrated by the method of Benesi (J.A.C.S., 78, 5490 (1956)), to determine their acid strength distributions.

| Acid Strength, Percent $H_2SO_4$ (eq.) equiv. | Acid Titer, Meq./g. | | | | |
|---|---|---|---|---|---|
| | <48 | 48-71 | 71-91 | >91 | Total |
| Catalyst E | 0.00 | 0.05 | 0.08 | 0.00 | 0.13 |
| Catalyst G | 0.02 | 0.00 | 0.00 | 0.00 | 0.02 |
| Catalyst H | 0.07 | 0.00 | 0.00 | 0.00 | 0.07 |
| Catalyst I | 0.04 | 0.02 | 0.23 | 0.00 | 0.29 |

These data show the superiority in acid strength stability of Catalyst "I" over the other catalysts, including the standard commercial Catalyst "E." The data also show the ability of $CO_2$ when added to the mixed organic solution of ethyl silicate and aluminum alcoholate in the preparation of the catalyst to impart superior acidity compared to $SO_2$ or no added gases. This high acidity stability makes itself manifest in the cracking operation.

The proportions of chemicals used in preparing the catalyst of Example 20 can be varied to give a silica-alumina catalyst containing between about 10% and 50% by weight of alumina.

EXAMPLE 22

In the catalyst of this form of the invention, the use of $CO_2$ offers further advantage. A catalyst made employing dry HCl such as Catalyst "F" has good attrition properties, better than standard Catalyst "E." However, the use of $CO_2$ in a catalyst such as Catalyst "I" greatly increases the catalyst strength, as shown by lower attrition rate as shown in the following tabulation.

Catalyst:     Standard roller attrition rate, percent/hr.
- Standard Catalyst "E" _____ 3.7
- Catalyst "F" employing dry HCl _____ 3.4
- Catalyst "I" employing $CO_2$ _____ 2.4

EXAMPLE 23

Catalyst "I" of our invention, prepared from ethyl silicate and aluminum alcoholate with added $CO_2$, was compared in a standard cetane cracking test with standard Catalyst "E." Both catalysts were steamed at 1050° F., 0 p.s.i.g., for 16 hours prior to the test. The results are summarized below.

Catalyst:     w./hr./w. to give 40% conversion
- Standard Catalyst "E" _____ 2.3
- Catalyst "I" _____ 6.3

The yields of carbon and naphtha were essentially equivalent to the standard catalyst at these conversions but the yield of $C_3-$ dry gas was lower, 8% vs. 9% for the standard Catalyst "E" at 45% conversion.

Another highly active, selective, attrition resistant catalyst comprising silica-alumina was made by mixing silica hydrosol and an aluminum salt of an organic acid such as citric or tartaric. By means of this procedure any alumina content can be made and the resulting catalyst requires a minimum of washing or none. The catalyst is stable toward heat and steam and is more active than conventional silica-alumina cracking catalyst and just as selective. The catalyst is prepared from an organic acid salt of aluminum and an ammoniacal silica hydrosol.

Catalyst "E" from Example 11 will be referred to in the following examples for purposes of comparison.

EXAMPLE 24

An improved high $Al_2O_3$ (40%)-$SiO_2$ cracking catalyst was prepared as follows. Four liters of a freshly prepared 3% silica hydrosol were added to one liter of a 0.33 N $NH_4OH$ solution with stirring. The pH of the solution was 8.5. To this sol solution, was added slowly a solution comprising 340 g. aluminum citrate, 100 ml. conc. $NH_4OH$ and 2 liters of water using good stirring. The mixture began to gel within minutes and $CO_2$ (as 100 g. Dry Ice) was added to aid gelation. The final pH of the mixture was 6.0. The mixture was allowed to age 48 hours at room temperature and then dried at a temperature of 250° F. The catalyst was steamed for 16 hours at 1050° F., 0 p.s.i.g. before testing. This steam treatment simulates plant catalyst deactivation. This superior catalyst will hereafter be called Catalyst "J."

EXAMPLE 25

Catalysts "E" and "J" were tested for cracking activity by feeding cetane at 900° F. in a 10 minute cycle. Each of these catalysts had been steam deactivated at 1050° F., 0 p.s.i.g. for 16 hours prior to testing. The results are shown below.

| Catalyst | W./hr./w. to give 43% Conversion | Gas Make at 43% | Naphtha Make at 43% |
|---|---|---|---|
| E | 2.30 | 8.2 | 19 |
| J | 3.25 | 7.8 | 19 |

The results above indicate that the higher activity, manifested in a higher feed rate to obtain the same conversion, is accompanied by equivalent naphtha production, and as low, if not lower, gas make for the superior high alumina Catalyst "J."

EXAMPLE 26

The surface acidity of Catalysts "E" and "J" was determined by titration in a non-aqueous system with butylamine. The results for the acidity measurements, after steam treatment, for these catalysts are given below.

Catalyst:     Acidity, meq./g.
- E _____ 0.13
- J _____ 0.22

Again the superior high $Al_2O_3$-$SiO_2$ Catalyst "J" shows its higher activity as shown in Example 25 in the higher surface acid titer.

EXAMPLE 27

A further example of the higher stability of the high $Al_2O_3$ Catalyst "J" is shown in the percent retention of surface area after steaming as in Example 18. This is indicated below.

Catalyst:     Percent original surface area retained after steaming
- E _____ 45
- J _____ 74

EXAMPLE 28

A further desirable characteristic of a good cracking catalyst is a low attrition rate. Each of these materials was given a standard Roller attrition test and the results are shown below.

Catalyst:     Percent attrition in 1 hour
- E _____ 3.7
- J _____ 2.7

Thus it can be seen that a superior high $Al_2O_3$ content silica-alumina cracking catalyst may be prepared from the aluminum salt of an organic acid and a commercial silica hydrosol. This catalyst combines high activity with normal product distribution, stability, and improved catalyst strength.

Another highly active cracking catalyst showing a high selectivity to aromatic hydrocarbons and $C_5$ plus naphtha contains a minor amount, up to 10%, of gallium oxide in a high alumina content silica-alumina catalyst. Dry gas yields on a weight basis are comparable or less than conventional silica-alumina catalyst containing about 13% alumina. This catalyst has a high acid titer and acid strength, as well as high surface area, low attrition rate, good heat and steam stability.

It is desirable to get complete dispersion of the alumina throughout the silica hydrogel or gel lattice so that there are no residues of crystalline alumina dispersed through the catalyst composite. In addition to these desirable physical and chemical properties it has been found that the cracking pattern of the catalyst can be changed or altered to favor the production of a higher proportion of naphtha of higher aromatic content without an increase in the yield of dry gas (wt. basis).

The catalyst may contain up to 10% by weight of gallium oxide, but preferably about 1-5% gallium oxide is used. The catalyst contains between about 10 and 50% alumina and the rest silica. It is preferred to add the gallium oxide at the time of mixing the solutions to produce the composite catalyst and not by impregnating an already finished silica-alumina gel or catalyst. This catalyst has the unexpected property of producing high aromatic content gasoline in a cracking operation. The catalyst may contain 20-45 parts by weight of alumina, 79-55 parts by weight of silica and 1-10 parts by weight of gallium oxide.

EXAMPLE 29

The catalyst of this example is the standard commercial catalyst comprising 13% $Al_2O_3$-87% $SiO_2$ and similar to Catalyst "D" of Example 4. It is believed to be made by preparing a pumpable slurry of sodium silicate at pH 7, impregnating with alum, ammoniating, and spray drying, and then calcining 16 hours at 1000° F. This catalyst is referred to as catalyst "K" in the examples below.

EXAMPLE 30

A fresh 3% silica hydrosol, made by the ion exchange method of Example 2, was prepared and 3.4 liters thereof were admixed with 20 ml concentrated $NH_4OH$ and gave a resultant sol having a pH of 9.5. To this were added slowly and with stirring 640 ml of an aluminum alcoholate solution (equivalent to 87 gr. $Al_2O_3/l.$) and hydrolysis effected. To this mixed slurry were added 85 mol of a solution comprising gallium chloride (equivalent to 11.5 gr. $Ga_2O_3$). The pH was adjusted to 7.0 with $NH_4OH$, the composite heat soaked 3 hours at 170–190° F. and cooled. The pH was readjusted to 7.0 with $NH_4OH$ and the mixture oven dried at 250° F. and then calcined 16 hours at 1000° F. This catalyst is referred to in the subsequent example as Catalyst "L." It comprises 33% $Al_2O_3$-62% $SiO_2$-5% $Ga_2O_3$.

EXAMPLE 31

Catalysts "K" and "L" were each steamed 16 hours at 1050° F. and atmospheric pressure. When examined by X-ray, both catalysts showed no crystalline alumina present. Both catalysts were titrated with n-butyl amine in a non-aqueous system using the method of Benesi. The results are tabulated.

| Acid Strength, Percent $H_2SO_4$ equiv. | Acid Titer, Meq./g. | | | | |
|---|---|---|---|---|---|
| | <48 | 48–71 | 71–91 | >91 | Total |
| Catalyst "K" | 0.00 | 0.05 | 0.08 | 0.00 | 0.13 |
| Catalyst "L" | 0.03 | 0.09 | 0.13 | 0.00 | 0.25 |

Thus it can be seen that the improved catalyst "L" of this invention is much more acidic than conventional catalyst "K."

EXAMPLE 32

Catalysts "K" and "L" after steaming as in Example 31 were tested in a cracking operation at 900° F., 10 minute cycle, using pure cetane feed. The following results were obtained.

| Catalyst | K | L |
|---|---|---|
| Conversion, Wt. Percent | 31.5 | 31.5 |
| W./hr./w | 3.6 | 5.2 |
| $C_3-$ Gas, Wt. Percent | 5.7 | 5.3 |
| $C_5$ Naphtha, Wt. Percent | 15.0 | 15.6 |

Catalyst "L" of the present invention is much more active than "K" while giving some less gas and some more naphtha than catalyst "K." It should be stated, however, that the $C_3-$ gas from Catalyst "L" contained considerably more hydrogen than that from Catalyst "K" but this is not reflected on the weight percent data in the table above.

EXAMPLE 33

A fresh silica hydrosol (3% solids content) was made ammoniacal as in Example 30 and aluminum alcoholate solution hydrolyzed therein. A dilute $GaCl_3$ solution was added to the composite with stirring and the pH adjusted to about 6.8 with $NH_4OH$ before oven drying at about 250° F. This catalyst was calcined at 1000° F. for 16 hours and is designated Catalyst "M." The amounts of the reagents used were such as to give a composition to the catalyst of 68% $SiO_2$-31% $Al_2O_3$-1.0% $Ga_2O_3$.

EXAMPLE 34

Catalysts "K" and "M" were tested in a fixed catalyst bed reactor for their cracking properties using an East Texas Light gas oil feed, 950° F., and 30 minute cycle. The naphtha quality data follow.

| Catalyst | K | M |
|---|---|---|
| Conversion, wt. percent | 50.5 | 50.5 |
| Aromatics in naphtha, wt. percent | 25 | 35 |
| Olefins in naphtha, wt. percent | 35 | 29 |

The gas densities of the $C_3-$ materials from both catalysts were in the range of 1.0–1.1 based on air density equal to unity. Thus it is seen that with as little as 1% $Ga_2O_3$ added a marked increase in aromatics is produced with no change in gas density.

This form of the invention includes a high alumina-silica-alumina catalyst, a minor amount of gallia, preferably 1–5% which results in a catalyst producing naphtha of enhanced aromatic content with very little change, if any, in the weight of $C_3-$ gas and $C_5+$ naphtha yield.

The silica-alumina catalyst of the present invention may be made to contain between about 10% and 50% by weight of alumina.

What is claimed is:

1. A catalyst composed essentially of 20 to 45 parts by weight of alumina, 79 to 55 parts by weight of silica and 1 to 10 parts by weight of gallium oxide.

2. A catalyst consisting essentially of 33% $Al_2O_3$-62% $SiO_2$-5% $Ga_2O_3$.

3. A catalyst consisting of a major proportion of silica, at least 30% of alumina and 1%–10% gallium oxide.

4. A method of preparing an active high alumina silica-alumina catalyst containing at least 25% alumina which comprises mixing ammoniacal silica hydrosol with aluminum alcoholate to hydrolyze the alcoholate and form a silica-alumina slurry, adding a gallium salt solution to said silica-alumina slurry in an amount sufficient to provide about 1 to 10% gallium oxide in the catalyst product, aging the resulting slurry for at least 3 hours, and drying and calcining the aged slurry to produce a silica-alumina-gallium oxide catalyst consisting essentially of at least 25% alumina, 1–10% gallium oxide and at least 55% silica.

References Cited by the Examiner

UNITED STATES PATENTS

| | | | |
|---|---|---|---|
| 1,935,177 | 11/33 | Connolly et al. | 252—455 X |
| 2,412,958 | 12/46 | Bates et al. | 252—453 |
| 2,470,193 | 5/49 | Stratford | 208—119 |
| 2,470,411 | 5/49 | Corner | 252—457 |
| 2,485,260 | 10/49 | Connolly | 208—119 |
| 2,762,782 | 9/56 | Kimberlin et al. | 252—463 |
| 2,779,742 | 1/57 | Emmett | 252—455 |
| 2,784,147 | 3/57 | Strecker et al. | 252—463 X |
| 2,798,857 | 7/57 | Kimberlin et al. | 252—453 |
| 2,809,169 | 10/57 | Whiteley et al. | 252—453 X |
| 2,814,599 | 11/57 | Lefrancois et al. | 252—455 X |
| 2,859,185 | 11/58 | Kimberlin et al. | 252—463 X |
| 3,003,951 | 10/61 | Winyall | 252—453 X |

MAURICE A. BRINDISI, *Primary Examiner.*

JULIUS GREENWALD, *Examiner.*